(12) United States Patent
Park (10) Patent No.: US 11,577,574 B2
(45) Date of Patent: Feb. 14, 2023

(54) APPARATUS FOR AND METHOD OF ESTIMATING VEHICLE WEIGHT BY USING VEHICLE HEIGHT ADJUSTING DEVICE

(71) Applicants: Hyundai Motor Company, Seoul (KR); Kia Motors Corporation, Seoul (KR)

(72) Inventor: Jae Hyung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 331 days.

(21) Appl. No.: 16/849,676

(22) Filed: Apr. 15, 2020

(65) Prior Publication Data

US 2021/0178849 A1  Jun. 17, 2021

(30) Foreign Application Priority Data

Dec. 16, 2019 (KR) .......................... 10-2019-0167926

(51) Int. Cl.

| | |
|---|---|
| *B60G 17/018* | (2006.01) |
| *B60G 17/017* | (2006.01) |
| *B60G 17/052* | (2006.01) |
| *B60G 17/015* | (2006.01) |
| *B60G 17/019* | (2006.01) |

(52) U.S. Cl.

CPC ....... *B60G 17/0182* (2013.01); *B60G 17/017* (2013.01); *B60G 17/0155* (2013.01); *B60G 17/0157* (2013.01); *B60G 17/01933* (2013.01); *B60G 17/0525* (2013.01); *B60G 2202/412* (2013.01); *B60G 2400/252* (2013.01); *B60G 2400/60* (2013.01); *B60G 2400/61* (2013.01); *B60G 2400/92* (2013.01); *B60G 2800/914* (2013.01)

(58) Field of Classification Search

CPC .............. B60G 17/018; B60G 17/0182; B60G 17/0525; B60G 17/015; B60G 17/0152; B60G 17/0155; B60G 17/0157; B60G 17/017; B60G 2400/252; B60G 2400/60; B60G 2400/61; B60G 2400/92; B60G 2400/202; B60G 17/01933; B60G 2202/412; B60G 2800/914; B60G 2800/915; B60W 40/13; B60W 2530/10; B60W 10/22

See application file for complete search history.

(56) References Cited

FOREIGN PATENT DOCUMENTS

| JP | 11222018 A | * | 8/1999 |
|---|---|---|---|
| JP | 2010036703 A | * | 2/2010 |
| JP | 2010105584 A | * | 5/2010 |

\* cited by examiner

*Primary Examiner* — Keith J Frisby (74) *Attorney, Agent, or Firm* — Fox Rothschild LLP (57) ABSTRACT

An apparatus for estimating vehicle weight using a vehicle height adjusting device is provided. The apparatus includes a vehicle height adjusting device that raises or lowers four positions of front left (FL) and right (FR) sides and rear left (RL) and right (RR) sides of a vehicle body, respectively. A vehicle height controller operates the vehicle height adjusting device to raise or lower the FL and FR sides and the RL and RR sides of the vehicle body. A weight estimating unit measures time required for raising or lowering the vehicle body or operating speed of the vehicle body and calculates an expected vehicle weight value by comparing the time required or the operating speed with a preset reference data.

16 Claims, 6 Drawing Sheets

FIG. 1

RELATED ART

APPARATUS FOR AND METHOD OF ESTIMATING VEHICLE WEIGHT BY USING VEHICLE HEIGHT ADJUSTING DEVICE

CROSS REFERENCE TO RELATED APPLICATION

The present application claims priority to Korean Patent Application No. 10-2019-0167926, filed Dec. 16, 2019, the entire contents of which is incorporated herein for all purposes by this reference.

BACKGROUND

Field of the Invention

The present disclosure relates to a technique for estimating weight of a vehicle, which changes according to a driving situation of the vehicle, and more particularly, to a technique for estimating a weight distribution of each of front left, front right, rear left, and rear right sides of the vehicle using a vehicle height adjusting device mounted thereon.

Description of the Related Art

A weight value of a vehicle may be used as reference information in vehicle body control. According to the related art, to estimate weight of a vehicle, a method is used in which estimating an engine acceleration and a wheel acceleration using an engine torque value and estimating expected weight using base weight are performed.

However, in a process of estimating the engine acceleration using the engine torque value, there are many anomalous external factors (e.g., road surface condition, rapid acceleration and deceleration condition, road inclination angle, and the like). Accordingly, there are disadvantages the accuracy of weight estimation. In addition, when using a conventional method of estimating vehicle weight, only the weight of the entire vehicle may be estimated, and there are limitations in that a weight distribution state of front, rear, left, and right sides of the vehicle is unable to be estimated.

The foregoing is intended merely to aid in the understanding of the background of the present disclosure, and is not intended to mean that the present disclosure falls within the purview of the related art that is already known to those skilled in the art.

SUMMARY

Accordingly, the present disclosure more accurately estimates weight of an entire vehicle and weight distribution of each of front left, front right, rear left, and rear right sides by using a vehicle height adjusting device mounted on the vehicle. Accordingly, the present disclosure contributes to improving control performance of various systems such as suspension, steering, braking, powertrain, and the like.

In order to achieve the above objective, an apparatus for estimating vehicle weight using a vehicle height adjusting device may include: a vehicle height adjusting device configured to raise and lower four positions of front left (FL) and right (FR) sides and rear left (RL) and right (RR) sides of a vehicle body, respectively; a vehicle height controller configured to operate the vehicle height adjusting device to raise or lower the FL and FR sides and the RL and RR sides of the vehicle body; and a weight estimating unit configured to measure time required for raising or lowering the vehicle body or operating speed of the vehicle body and to calculate an expected vehicle weight value by comparing the time required or the operating speed with a preset reference data.

The weight estimating unit may be configured to measure the time required for raising the vehicle body or the operating speed of the vehicle body and the time required for lowering the vehicle body or the operating speed of the vehicle body, compare the time required for raising the vehicle body or the operating speed of the vehicle body with the reference data, to thus calculate a first expected vehicle weight value according to a preset calculation criterion, and compare the time required for lowering the vehicle body or the operating speed of the vehicle body with the reference data, to thus calculate a second expected vehicle weight value according to the preset calculation criterion.

The weight estimating unit may then be configured to calculate a final expected vehicle weight value by applying preset weights to the first expected vehicle weight value and the second expected vehicle weight value, respectively. The preset weights may be set such that the second expected vehicle weight value has greater influence than the first expected vehicle weight value. The weight estimating unit may be configured to measure time required or the operating speed while sequentially raising or lowering the FL and FR sides and the RL and RR sides of the vehicle in predetermined combinations, and compare the time required or the operating speed with respect to the predetermined combinations with the preset reference data, to thus calculate a weight distribution of the FL and FR sides and the RL and RR sides of the vehicle.

The vehicle height controller may be configured to raise or lower either one of the combination of the FL and FR sides and the combination of the RL and RR sides of the vehicle body first, and then raise or lower a remaining combination. In particular, the vehicle height controller may be configured to raise or lower either one of the combination of FL and RL sides and the combination of FR and RR sides of the vehicle body first, and then raise or lower a remaining combination.

The vehicle height adjusting device may include: a pneumatic actuator installed at each of the FL and FR sides and at each of the RL and RR sides of the vehicle to adjust a relative location of the vehicle body with respect to wheels by compressed air; a compressor configured to generate the compressed air to be provided to the pneumatic actuator; and a valve mechanism provided to adjust a compressed air flow path between the compressor and the pneumatic actuator.

In the calculating of the expected vehicle weight value by comparing the time required or the operating speed with the preset reference data, the weight estimating unit may be configured to calculate the expected vehicle weight value by reflecting variables for frictional force, temperature, and a cross-sectional area of a chamber, inside the pneumatic actuator. Additionally, in the calculating of the expected vehicle weight value by comparing the time required or the operating speed with the preset reference data, the weight estimating unit may be configured to calculate the expected vehicle weight value based on vehicle height at a time when the time required for raising or lowering the vehicle body or the operating speed of the vehicle body is started to be measured. The vehicle height adjusting device may include: an electric actuator installed at each of the FL and FR sides and at each of the RL and RR sides of the vehicle to adjust a relative location of the vehicle body with respect to wheels; and a battery storing power provided to the electric actuator.

In addition, to achieve the above objective, a method of estimating the vehicle weight using the vehicle height adjusting device may include: raising or lowering, by a vehicle height controller, front left (FL) and right (FR) sides and rear left (RL) and right (RR) sides of a vehicle body using the vehicle height adjusting device; and calculating, by a weight estimating unit, an expected vehicle weight value by measuring time required for raising or lowering the vehicle body or operating speed of the vehicle body, and by comparing the time required or the operating speed with preset reference data.

The calculating of the expected vehicle weight value may include: measuring the time required for raising the vehicle body or the operating speed of the vehicle body and the time required for lowering the vehicle body or the operating speed of the vehicle body, calculating a first expected value according to a preset calculation criterion by comparing the time required for raising the vehicle body or the operating speed with the reference data, and calculating a second expected value according to the preset calculation criterion by comparing the time required for lowering the vehicle body or the operating speed with the reference data.

Preset weights may be applied to the first expected vehicle weight value and the second expected vehicle weight value, respectively, whereby a final expected vehicle weight value may be calculated. The preset weights may be set such that the second expected vehicle weight value has greater influence than the first expected vehicle weight value.

In the raising or lowering of the vehicle body, the FL and FR sides and the RL and RR sides of the vehicle body may be sequentially raised or lowered in predetermined combinations, and in the calculating of the expected vehicle weight value, the required time or the operating speed may be measured while the predetermined combinations are sequentially raised or lowered, respectively, and a weight distribution of the FL and FR sides and the RL and RR sides of the vehicle may be calculated by comparing the time required or the operating speed with respect to the predetermined combinations with the preset reference data.

Either one of the combination of the FL and FR sides and the combination of the RL and RR sides of the vehicle body may be raised or lowered first, and then a remaining combination may be raised or lowered. Either one of the combination of the FL and RL sides and the combination of the FR and RR sides of the vehicle body may be raised or lowered first, and then a remaining combination may be raised or lowered.

When the vehicle height adjusting device uses a pneumatic actuator, in the calculating of the expected vehicle weight value by comparing the time required or the operating speed with the preset reference data, the expected vehicle weight value may be calculated by reflecting variables for frictional force, temperature, and a cross-sectional area of a chamber, inside the pneumatic actuator. In the calculating of the expected vehicle weight value by comparing the time required or the operating speed with the preset reference data, the expected vehicle weight value may be calculated based on vehicle height at a time when the time required for raising or lowering the vehicle body or the operating speed of the vehicle body is started to be measured.

As described above, the present disclosure allows weight of an entire vehicle and weight distribution of each of front left, front right, rear left, and rear right parts to be more accurately estimated by using the vehicle height adjusting device mounted on the vehicle. Accordingly, the present disclosure improves control performance of various systems such as suspension, steering, braking, powertrain, and the like.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present disclosure will be described in detail with reference to the accompanying drawings so that those skilled in the art may easily implement the present disclosure. As those skilled in the art would realize, the present disclosure may be modified in various different ways, all without departing from the spirit or scope thereof and is not limited to the exemplary embodiments demonstrated here.

In addition, in the drawings, parts irrelevant to the description are omitted in order to clearly describe the present disclosure, and like reference numerals designate like parts throughout the specification. Throughout the specification, when a part is said to "include" a certain component, it means that the part may further include other components, without excluding the other components unless specifically stated otherwise.

Hereinafter, an apparatus for and a method of estimating vehicle weight by using a vehicle height adjusting device according to an exemplary embodiment of the present disclosure will be described with reference to the drawings.

Figure 1:
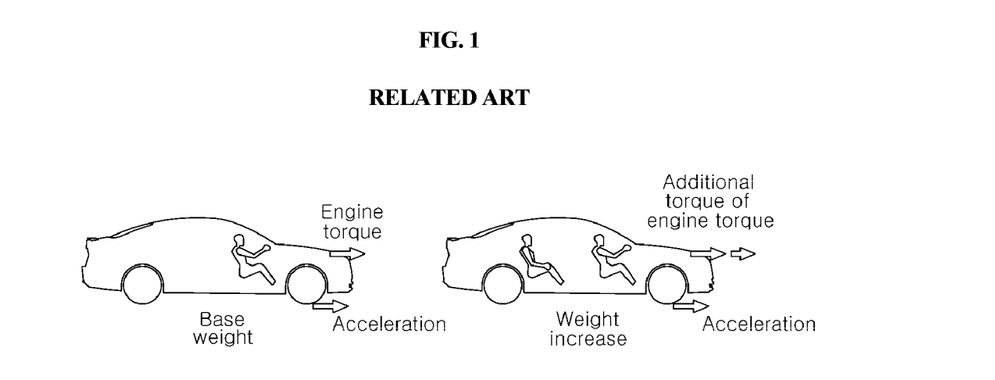
FIG. 1 shows views illustrating a conventional method of estimating vehicle weight according to the related art.

FIG. 1 shows views illustrating a conventional method of estimating vehicle weight. With reference to FIG. 1, in the related art, an engine torque value is used to estimate vehicle weight. Since the engine torque value is used, there are drawbacks since the engine torque value has a limitation of being estimated only when the accelerator pedal is engaged and also, due to many anomalous external factors such as road surface condition, rapid acceleration and deceleration conditions, road inclination angle, and the like in a process of estimating engine acceleration with the engine torque value, accuracy of an estimated engine acceleration value is low. Furthermore, according to the related art, only the weight of the entire vehicle may be estimated and a weight distribution state of front, rear, left, and right sides of the vehicle is unable to be estimated.

Figure 2:
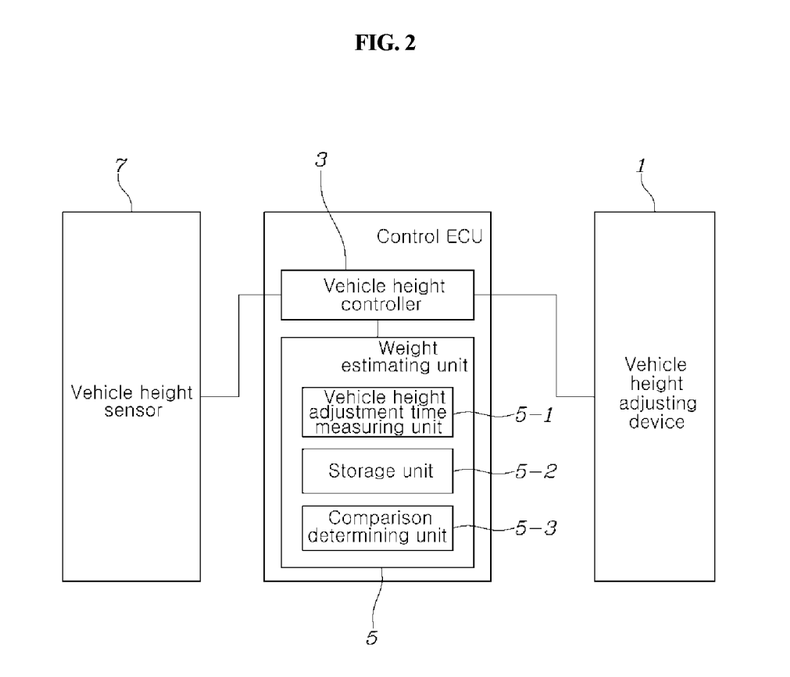
FIG. 2 is a block diagram of an apparatus for estimating vehicle weight by using a vehicle height adjusting device according to an exemplary embodiment of the present disclosure.

With reference to FIG. 2, the apparatus for estimating the vehicle weight of the present disclosure may include: a vehicle height adjusting device 1 configured to raise and lower four positions of front left (FL) and right (FR) sides and rear left (RL) and right (RR) sides of a vehicle body, respectively; a vehicle height controller 3 configured to operate the vehicle height adjusting device 1 to raise or lower the FL and FR sides and the RL and RR sides of the vehicle body; and a weight estimating unit 5 configured to measure time required for raising or lowering the vehicle body or operating speed of the vehicle body and to calculate an expected vehicle weight value by comparing the time required or the operating speed with a preset reference data.

In FIG. 2, the vehicle height controller 3 and the weight estimating unit 5 are represented in a form included in one control electronic control unit (ECU) but may, of course, be configured by being separated from each other. The vehicle height controller 3 may be configured to receive a signal from a vehicle height sensor 7, thereby adjusting height of the vehicle body with respect to wheels by operating the vehicle height adjusting device 1. The conventional vehicle height adjusting device 1 may use a method that uses a pneumatic actuator, an electric actuator, or the like.

Figure 3:
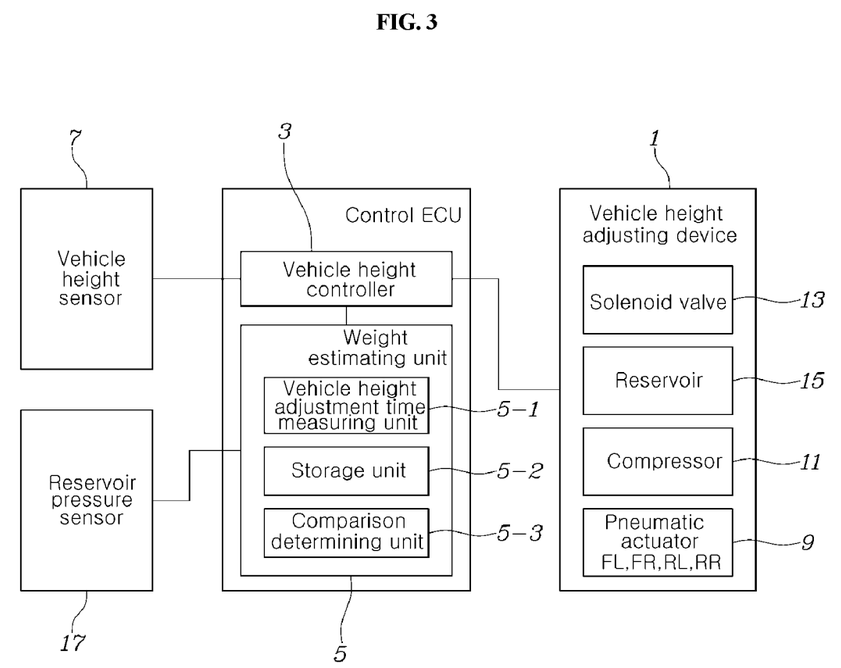
FIG. 3 is a block diagram illustrating an example in which the apparatus for estimating the vehicle weight of the present disclosure is applied to a vehicle height adjusting device having a pneumatic actuator according to an exemplary embodiment of the present disclosure.
Figure 4:
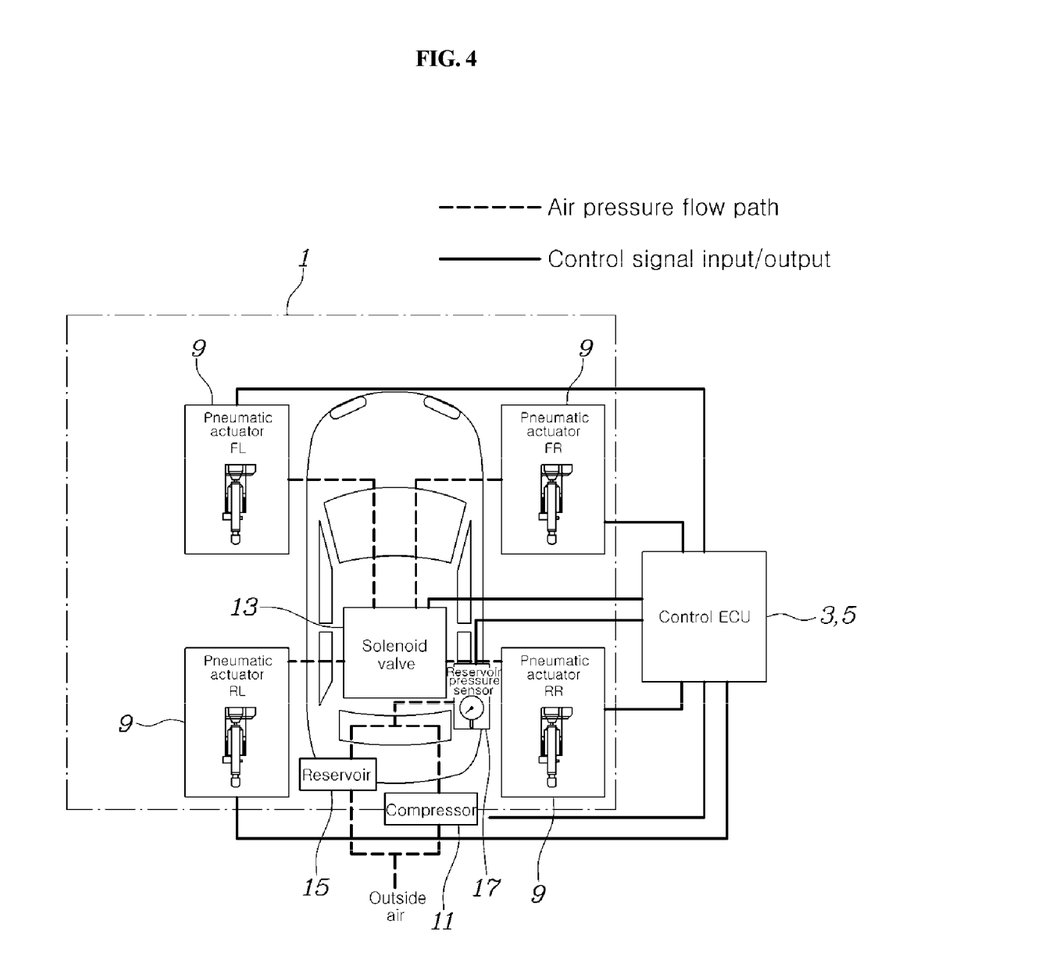
FIG. 4 is a block diagram representing the embodiment of FIG. 3 into another type according to an exemplary embodiment of the present disclosure.

FIGS. 3 and 4 specifically illustrate an example in which the apparatus for estimating the vehicle weight of the present disclosure is applied to a vehicle height adjusting device 1 that uses a pneumatic actuator. Therefore, hereinafter, a description will be made taking the vehicle height adjusting device 1, which uses the pneumatic actuator, as a reference. Of course, it should be noted that the present disclosure may be similarly applied to a vehicle height adjusting device that uses an electric actuator driven by battery power. In particular, when pressure of compressed air provided to the pneumatic actuator corresponds to current provided to the electric actuator, the present disclosure may be easily implemented in the vehicle height adjusting device that uses the electric actuator.

The vehicle height adjusting device 1 using the pneumatic actuator may include: a pneumatic actuator 9 installed at each of the FL and FR sides and the RL and RR sides of the vehicle to adjust the relative location of the vehicle body with respect to the wheels by the compressed air; a compressor 11 configured to generate the compressed air to be provided to the pneumatic actuator 9; and a valve mechanism configured to adjust the compressed air flow path between the compressor 11 and the pneumatic actuator 9. In other words, the compressed air generated from the compressor 11 may be supplied to and discharged from the pneumatic actuator 9 installed at each of the FL and FR sides and the RL and RR sides of the vehicle through the valve mechanism, to thus adjust the relative location of the vehicle body with respect to the wheels, thereby allowing the vehicle height to be adjusted.

For the valve mechanism, a solenoid valve 13 may be used. Particularly, the valve mechanism may be configured to allow the compressed air generated from the compressor 11 to be stored in a reservoir 15, whereby the compressed air may be more stably secured, and the pressure of the compressed air, which is generated from the compressor 11 to be supplied to the pneumatic actuator 9, may be checked by a reservoir pressure sensor 17 of the reservoir 15. Therefore, the vehicle height controller 3 of the control ECU may be configured to detect the current vehicle height through the signal of the vehicle height sensor 7 and, to implement target vehicle height, controls the compressed air, which is generated in the compressor 11 and stored in the reservoir 15, to be supplied to or discharged from each of the pneumatic actuators 9 by operating the solenoid valve 13, thereby allowing the vehicle height to be adjusted.

In addition, the vehicle height controller 3 may be configured to selectively operate each of the pneumatic actuators 9 at the four positions of the FL and FR sides and the RL and RR sides of the vehicle, whereby the four positions of the FL and FR sides and the RL and RR sides of the vehicle may be raised or lowered, respectively or in any combination thereof. The weight estimating unit 5 may include a vehicle height adjustment time measuring unit 5-1, a storage unit 5-2, and a comparison determining unit 5-3 as illustrated in FIGS. 2 and 3. In other words, while the vehicle body is raised or lowered by the vehicle height controller 3, the time required for raising or lowering the vehicle body or operating speed of the vehicle body may be measured by the vehicle height adjustment time measuring unit 5-1, and the time required or the operating speed may be compared with reference data stored in the storage unit 5-2 by the comparison determining unit 5-3, thereby estimating the vehicle weight.

Particularly, the "operating speed" may be obtained as follows. First, an amount of change of the vehicle height raised or lowered by the vehicle height controller 3 may be measured by the vehicle height sensor 7. Next, the measured amount of change of the vehicle height is divided by the time required, measured by the vehicle height adjustment time measuring unit 5-1, whereby the operating speed of the raising or lowering of the vehicle may be obtained. Therefore, in the application of the present disclosure, the time required and the operating speed may be practically used in almost the same concept and thus are described in an optional expression as described above.

Figure 5A:
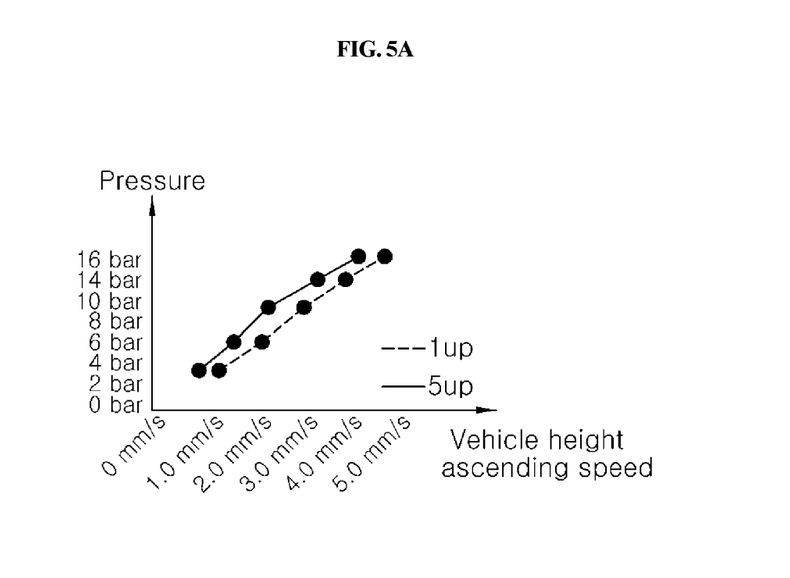
FIGS. 5A and 5B are graphs illustrating a change of speed in ascending or descending of vehicle height according to a change in vehicle weight according to an exemplary embodiment of the present disclosure.
Figure 5B:
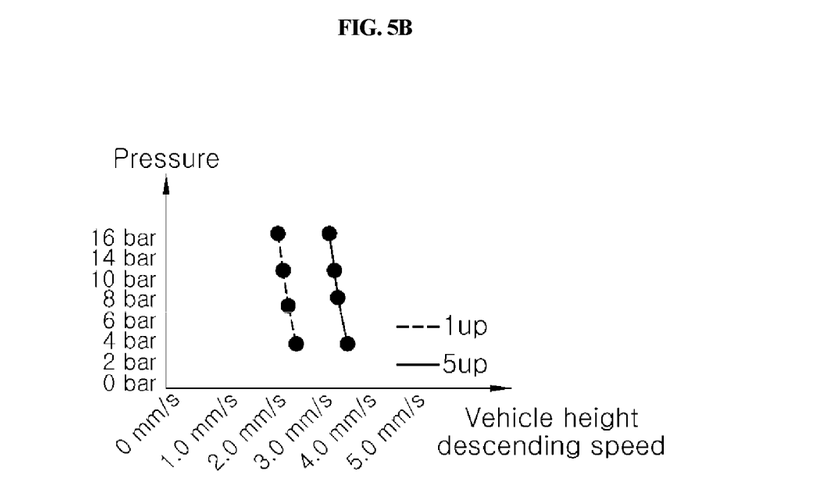

FIGS. 5A and 5B illustrate a principle of the present disclosure that changes of the ascending and descending speeds of the vehicle height performed by the vehicle height adjusting device 1 using the pneumatic actuator 9 are expressed according to the pressure provided to the pneumatic actuator 9, as the weight of the vehicle increases. Referring to FIG. 5A, when the weight of the vehicle is increased (1 up and 5 up represent the vacant weight and the maximum weight, respectively), the vehicle height ascending speed by the vehicle height adjusting device 1 is decreased, and, as for the same weight of the vehicle, it may be seen that the higher the pressure provided to the pneumatic actuator 9, the faster the vehicle height ascending speed.

Referring to FIG. 5B, when the weight of the vehicle is increased (1 up and 5 up represent the vacant weight and the maximum weight, respectively), the vehicle height descending speed by the vehicle height adjusting device 1 is increased, and, as for the same weight of the vehicle, the higher the pressure provided to the pneumatic actuator 9, the slower the vehicle height descending speed. In particular, it may be seen that, when the same difference in the pressure is provided to the pneumatic actuator 9, a corresponding difference in the vehicle height descending speed is less than a corresponding difference in the vehicle height ascending speed. In other words, when the vehicle body descends, the difference in the pressure provided to the pneumatic actuator 9 does not significantly affect the vehicle height descending speed.

In addition, when comparing FIGS. 5A and 5B, it may be seen that for the same level of the change in the weight of the vehicle body, the gap of the vehicle height descending speed is greater than the gap of the vehicle height ascending speed. The present disclosure utilizes the principle that as the weight of the vehicle changes as described above, each of the vehicle height ascending speed and the vehicle height descending speed by the vehicle height adjusting device 1 is changed, so is the time required thereof.

Particularly, the concept of estimating the weight of the vehicle by comparing the measured required time with reference data by the comparison determining unit 5-3 will be described through equation 1 below.

$$\text{Estimated increased weight} = \frac{T_{x\,at\,Px} - T_{min\,at\,Px}}{T_{val\,at\,Px}} \times (\text{maximum weight} - \text{vacant weight}) \quad \text{Equation 1}$$

wherein, the estimated increased weight refers to an increase in the weight with respect to the vacant weight of the ascending or descending vehicle.

In addition, the maximum weight generally refers the maximum weight that may be added to the corresponding vehicle, and the corresponding value may be freely set according to the vehicle or development intention.

$T_{x\,at\,Px}$ is the time required for raising or lowering the vehicle height of the vehicle, of which weight is to be estimated, by the vehicle height controller 3 when the reservoir 15 air pressure of the vehicle height adjusting device 1 is Px and represents the value measured by the vehicle height adjustment time measuring unit 5-1.

Here, $T_{val\,at\,Px} = T_{max\,at\,Px} - T_{min\,at\,Px}$.

In addition, $T_{max\,at\,Px}$ may be the time required for raising or lowering the vehicle height, in the same section as the $T_{x\,at\,Px}$ is measured, in a state where the vehicle, of which weight is to be estimated, is at the maximum weight when the reservoir 15 air pressure of the vehicle height adjusting device 1 is Px.

Further, $T_{min\,at\,Px}$ may be the time required for raising or lowering the vehicle height, in the same section as the $T_{x\,at\,Px}$ is measured, in a state where the vehicle, of which weight is to be estimated, is in the vacant weight when the reservoir 15 air pressure of the vehicle height adjusting device 1 is Px.

Specifically, for example, when the internal pressure of the reservoir 15 is about 16 bar, it may be assumed to take about 4 seconds as time required for raising the vehicle height from a lowest vehicle height location 00 mm to a preset vehicle height location of about 30 mm in a state of the vacant weight about 1500 kg, and it may also be assumed to take about 60 seconds as time required for raising the vehicle height from the lowest vehicle height location 00 mm to the preset vehicle height location of about 30 mm in a state of the maximum weight about 2500 kg.

In particular, $T_{val\,at\,Px}$ becomes 56 seconds (60 seconds-4 seconds), and when it takes 20 seconds to raise the vehicle, of which weight is to be estimated, from the initial vehicle height location 00 mm to the preset vehicle height location 30 mm, the estimated increased weight of the corresponding vehicle becomes (20−4)/56×1000 kg=285 kg and the weight of the vehicle may be estimated to be 1500 kg+285 kg=1785 kg.

Particularly, $T_{max\,at\,Px}$ and $T_{min\,at\,Px}$ correspond to the reference data stored in advance in the storage unit 5-2 of the weight estimating unit 5 and, as values measured while raising or lowering the vehicle height in the same section as the $T_{x\,at\,Px}$ is measured as described above, will be most preferably stored in the storage unit 5-2.

When the chamber pressure inside the pneumatic actuator 9 is high due to a high initial vehicle height, it may take a substantial amount of time to raise the vehicle height due to effect of the elastic deformation and the like of the chamber, and it may take a short amount of time to lower the vehicle height. When the chamber pressure is low due to low initial vehicle height, it may take a short amount of time for raising the vehicle height, and it may take a substantial amount of time for lowering the vehicle height. This is because the time required for raising and lowering the vehicle height of the same height difference is measured differently according to the initial location of the vehicle height.

Therefore, as described above, the reference data measured by the experiment in advance in the same section as the section for raising and lowering the vehicle height to estimate the weight of the vehicle is stored in advance in the storage unit 5-2. However, since the initial vehicle height locations before adjusting the vehicle height to estimate the weight of the vehicle may be in different situations such as High, Default, Low, and the like, and the pressure of the vehicle height adjusting device 1 may be different, obtaining and storing the above-mentioned $T_{max\,at\,Px}$ and $T_{min\,at\,Px}$ separately, for all possible situations of raising and lowering of the vehicle height for the weight estimation, may require too much space of the storage unit 5-2.

Therefore, first, the basic $T_{max\ at\ Px}$ and $T_{min\ at\ Px}$ may be stored. Next, the basic $T_{max\ at\ Px}$ and $T_{min\ at\ Px}$ may be changed to values suitable for corresponding situations and $T_{max\ at\ Px}$ and $T_{min\ at\ Px}$ may be multiplied by gains that are experimentally obtained and stored according to the locations of the initial vehicle height before adjusting the vehicle height to thus estimate the weight of the vehicle. Accordingly, it may be possible to use the appropriate values changed above.

When the vehicle height control for estimating the weight of the vehicle is initiated, after the vehicle height is initialized to the same location where the $T_{max\ at\ Px}$ and $T_{min\ at\ Px}$ that are stored in the storage unit 5-2 are measured, a method of measuring the $T_{x\ at\ Px}$ while adjusting the vehicle height in the same section may be used.

In addition, in calculating the expected vehicle weight value by comparing the time required or the operating speed with a preset reference data, the weight estimating unit 5 may be configured to calculate the expected vehicle weight value by reflecting variables for frictional force, temperature, and a cross-sectional area of the chamber, inside the pneumatic actuator 9. In estimating the weight of the vehicle as described above, a linear relationship of the pressure provided to the pneumatic actuator 9 and the time required for raising or lowering the vehicle body is premise, but nonlinear relationship may also be exhibited by the frictional force, temperature, and the cross-sectional area of the chamber, inside the pneumatic actuator 9.

In other words, when the frictional force applied to each part of the pneumatic actuator 9 is different, it may show the nonlinear relationship. In addition, when the internal temperature of the pneumatic actuator 9 is not constant, a change in pressure may occur and thus, the nonlinear relationship may also be exhibited in this case. In addition, when the cross-sectional area under the pressure of the chamber inside the pneumatic actuator 9 changes due to ascending or descending of the vehicle, the time that is required for raising or lowering the vehicle and the pressure may exhibit the nonlinear relationship. Therefore, when there exist variables (such as the frictional force, temperature, the cross-sectional area of the chamber, and the like, inside the pneumatic actuator 9) that exhibit a non-linear relationship as described above, by calculating the influence according to the linear relationship to be reflected in the expected vehicle weight value calculation, it may be possible to enable a more appropriate vehicle weight estimation.

The weight estimating unit 5 may be configured to measure the time required for raising the vehicle body or operating speed of the vehicle body and the time required for lowering the vehicle body or operating speed of the vehicle body, compare the time required for raising the vehicle body or operating speed of the vehicle body with the reference data to thus calculate a first expected vehicle weight value according to a preset calculation criterion, and compare the time required for lowering the vehicle body or operating speed of the vehicle body with the reference data to thus calculate a second expected vehicle weight value according to the preset calculation criterion. In addition, the weight estimating unit 5 may be configured to calculate a final expected vehicle weight value by applying preset weights to the first expected vehicle weight value and the second expected vehicle weight value, respectively. In particular, the weights may be set such that the second expected vehicle weight value has greater influence than the first expected vehicle weight value.

The followings are the reasons to apply the preset weights as above. As the weight of the vehicle body increases, the ascending speed of the vehicle body slows down, and the descending speed of the vehicle body increases. As shown in FIGS. 5A and 5B, according to the changes in the weight of the vehicle body, the gap of the changes in the descending speed is greater than the gap of the changes in the ascending speed. Therefore, it is easier and more accurate to differentiate between the changes in the weight of the vehicle by the time required for lowering the vehicle body. In addition, since a difference of the pressure provided to the pneumatic actuator 9 minimally affects the descending speed when the vehicle body descends, the weight of the vehicle body may be more accurately estimated using the time required for lowering the vehicle body.

Figure 6:
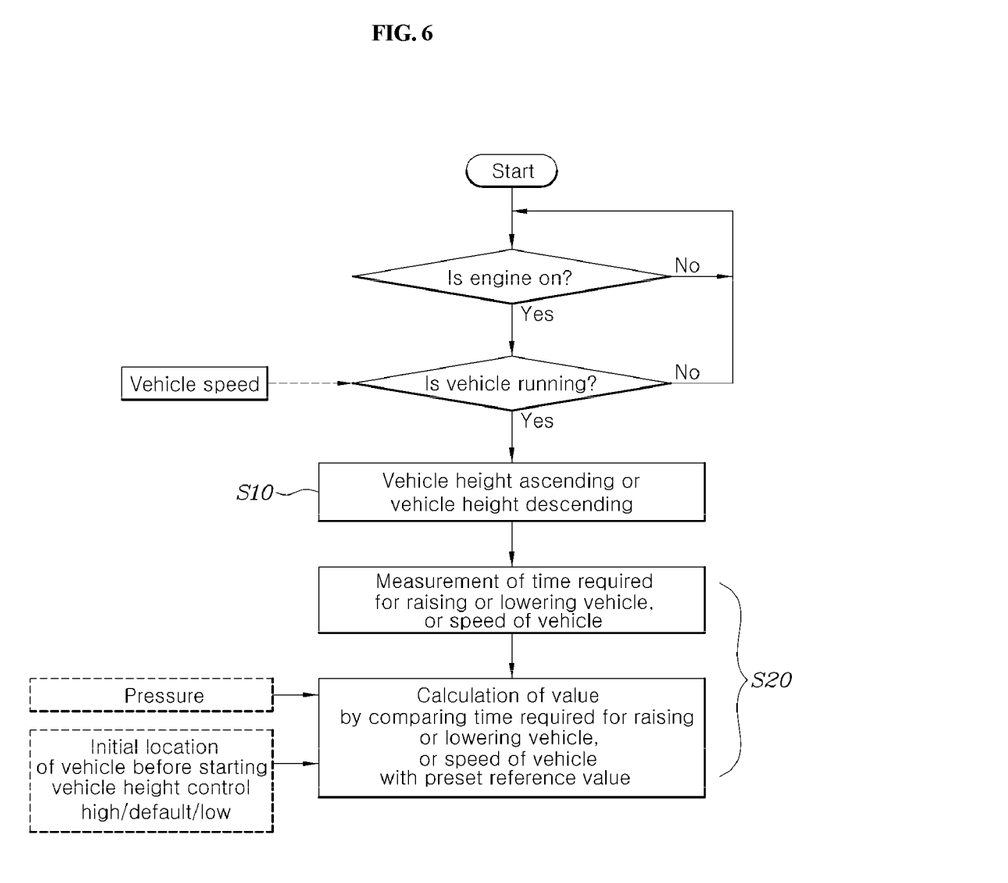
FIG. 6 is a flowchart illustrating a process of estimating the vehicle weight according to the exemplary embodiment of the present disclosure.

With reference to FIG. 6, a method of estimating the vehicle weight by using a vehicle height adjusting device of the present disclosure includes: step S10 of raising or lowering the FL and FR sides and the RL and RR sides of a vehicle body by a vehicle height controller, the vehicle height controller 3 operating the vehicle height adjusting device 1; and step S20 of measuring time required for raising or lowering the vehicle body, or operating speed of the vehicle body, thereby calculating an expected vehicle weight value by comparing the time required or the operating speed with preset reference data. In other words, the vehicle height controller 3 may be configured to measure the time required for raising or lowering the vehicle height while the vehicle height is raised or lowered by the vehicle height adjusting device 1 and compare the time required with the reference data to thus calculate the weight of the vehicle.

In addition, when estimating the weight of the vehicle by comparing the time required for raising or lowering the vehicle height with reference data, as described above, the pressure, provided to the pneumatic actuator 9, of the reservoir 15 may be provided from the reservoir pressure sensor 17, and information, regarding where the initial location of the vehicle height for vehicle height control for estimating the vehicle weight is, may be received from the vehicle height sensor 7. Accordingly, the weight of the vehicle may be calculated based on the corresponding situation by selecting suitable reference data or multiplying gains, thereby enabling more accurate estimation of the weight of the vehicle to be realized.

Meanwhile, it is shown in FIG. 6 that the vehicle weight estimation of the present disclosure is performed when the vehicle is in a driving state. However, when a vehicle engine is turned on, the vehicle height adjusting device 1 may be operated even when a vehicle is stopped, whereby the vehicle weight estimation may be executed. When the vehicle height adjusting device 1 is configured to use a pneumatic actuator, in calculating the expected vehicle weight value by comparing the time required or the operating speed with the preset reference data, the expected vehicle weight value may be calculated by reflecting the variables for the frictional force, temperature, and the cross-sectional area of the chamber, inside the pneumatic actuator.

Step S20 of calculating the expected vehicle weight value may include measuring the time required for raising the vehicle body or operating speed of the vehicle body and the time required for lowering the vehicle body or operating speed of the vehicle body, calculating the first expected value according to a preset calculation criterion by comparing the time required for raising the vehicle body or operating speed with the reference data, and calculating the second expected value according to the preset calculation criterion by comparing the time required for lowering the vehicle body or operating speed with the reference data.

In addition, the first expected vehicle weight value and the second expected vehicle weight value may be applied to preset weights, respectively, whereby a final expected vehicle weight value may be calculated. Particularly, the weights may be set such that the second expected vehicle weight value has greater influence than the first expected vehicle weight value. As described above, since the gap of the changes in the descending speed is greater than the gap of the changes in the ascending speed, it is easier and more accurate to differentiate between the changes in the weight of the vehicle by the time required for lowering the vehicle body.

Figure 7:
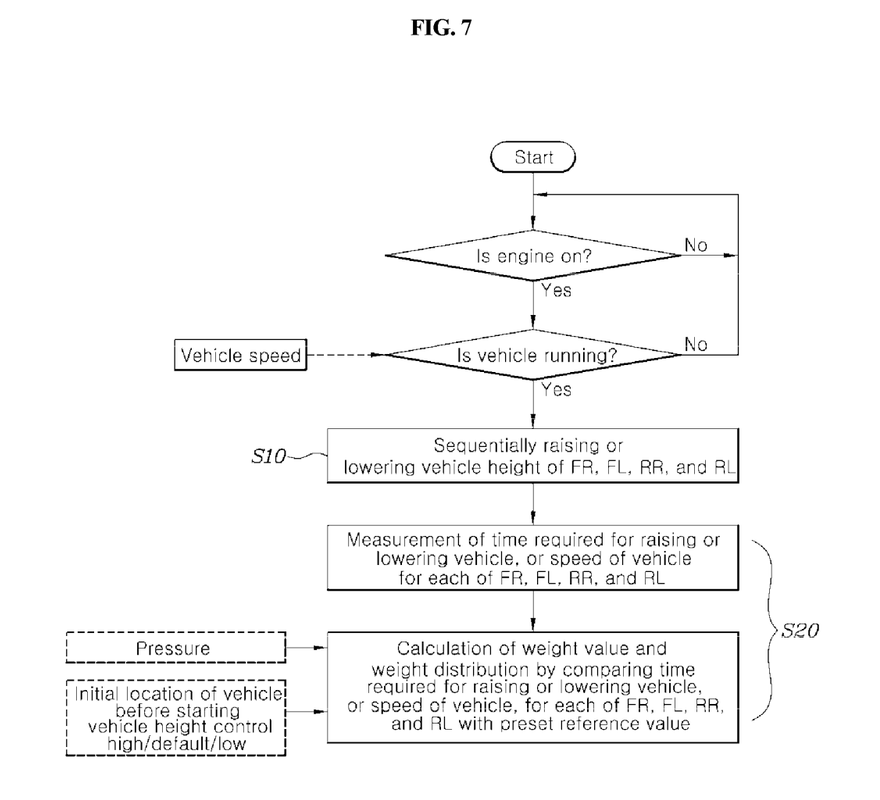
FIG. 7 is a flowchart illustrating a process of estimating weight and weight distribution of a vehicle according to an exemplary embodiment of the present disclosure.

With reference to an embodiment of FIG. 7, in step S10 of raising or lowering the vehicle body, the method of estimating the vehicle weight using the vehicle height adjusting device of the present disclosure sequentially raises or lowers the FL and FR sides and the RL and RR sides of the vehicle body in predetermined combinations; and, in step S20 of calculating the expected vehicle weight value, the method may include measuring the time required or the operating speed while sequentially raising or lowering the predetermined combinations, respectively, and comparing the respective measured required time or operating speed with preset reference data, thereby calculating the weight distribution of the FL and FR sides and the RL and RR sides of the vehicle.

In step S10 of raising or lowering the vehicle body, either one of a combination of the FL and FR sides and a combination of the RL and RR sides of the vehicle body may be raised or lowered first, and then a remaining combination of the vehicle body may be raised or lowered. In addition, either one of a combination of FL and RL sides and a combination of FR and RR sides of the vehicle body may be raised or lowered first, and then a remaining combination of the vehicle body may be raised or lowered, or both combinations may be sequentially performed together. In other words, a first combination may be raised or lowered first, following by a second combination.

In other words, the vehicle height controller 3 may be configured to: 1) raise or lower either one of the combination of the FL and FR sides and the combination of the RL and RR sides of the vehicle body first and then raise or lower a remaining combination of the vehicle body, 2) raise or lower either one of the combination of the FL and RL sides and the combination of the FR and RR sides of the vehicle body first and then raise or lower a remaining combination of the vehicle body, or 3) sequentially perform all of the above-mentioned combinations together. In parallel, the vehicle height controller 3 may be configured to operate the weight estimating unit 5 to measure the time required for raising or lowering each combination, or the operating speed of each combination and to compare the time required and the operating speed with the reference data, respectively. Accordingly, the weight distribution state of the FL and FR sides and the RL and RR sides of the vehicle may be estimated. For reference, the weight distribution state of the vehicle may be sufficiently estimated in the same as described above for the vehicle in a state of being driven and also being stopped.

Exemplary embodiments of the present disclosure are not implemented only by the above-described apparatus and/or method. Although the exemplary embodiments of the present disclosure have been described in detail above, a scope of a right of the present disclosure is not limited thereto, but various modifications and improvements of those skilled in the art using the basic concept of the present disclosure as defined in the following claims also belong to the scope of the present disclosure.

What is claimed is:

1. An apparatus for estimating vehicle weight by using a vehicle height adjusting device, comprising:
   a vehicle height adjusting device configured to raise and lower four positions of front left (FL) and right (FR) sides and rear left (RL) and right (RR) sides of a vehicle body, respectively;
   a vehicle height controller configured to operate the vehicle height adjusting device to raise or lower the FL and FR sides and the RL and RR sides of the vehicle body; and
   a weight estimating unit configured to:
      measure time required for raising the vehicle body or operating speed of raising the vehicle body and time required for lowering the vehicle body or operating speed of lowering the vehicle body;
      compare the time required for raising the vehicle body or the operating speed of raising the vehicle body with a preset reference data to calculate a first expected vehicle weight value according to a presets calculation criterion;
      compare the time required for lowering the vehicle body or the operating speed of lowering the vehicle body with the preset reference data to calculate a second expected vehicle weight value according to the preset calculation criterion; and
      calculate a final expected vehicle weight value by applying preset weights to the first expected vehicle weight value and the second expected vehicle weight value, respectively.

2. The apparatus of claim 1, wherein the preset weights are set such that the second expected vehicle weight value is greater than the first expected vehicle weight value.

3. The apparatus of claim 1, wherein the weight estimating unit is configured to:
   measure time required or the operating speed while sequentially raising or lowering the FL and FR sides and the RL and RR sides of the vehicle in predetermined combinations, and
   compare the time required or the operating speed with respect to the predetermined combinations with the preset reference data to calculate a weight distribution of the FL and FR sides and the RL and RR sides of the vehicle.

4. The apparatus of claim 3, wherein the vehicle height controller is configured to first raise or lower a first combination of the combination of the FL and FR sides and the combination of the RL and RR sides of the vehicle body, and then raise or lower a second combination of the combination of the FL and FR sides and the combination of the RL and RR sides of the vehicle body.

5. The apparatus of claim 3, wherein the vehicle height controller is configured first to raise or lower a first combination of the combination of FL and RL sides and the combination of FR and RR sides of the vehicle body, and then raise or lower a second combination of the combination of FL and RL sides and the combination of FR and RR sides of the vehicle body.

6. The apparatus of claim 1, wherein the vehicle height adjusting device includes:
   a pneumatic actuator installed at each of the FL and FR sides and at each of the RL and RR sides of the vehicle to adjust a relative location of the vehicle body with respect to wheels by compressed air;

a compressor configured to generate the compressed air to be provided to the pneumatic actuator; and a valve mechanism that adjusts a compressed air flow path between the compressor and the pneumatic actuator.

7. The apparatus of claim 6, wherein in the calculating of the expected vehicle weight value by comparing the time required or the operating speed with the preset reference data, the weight estimating unit is configured to calculate the expected vehicle weight value by reflecting variables for frictional force, temperature, and a cross-sectional area of a chamber, inside the pneumatic actuator.

8. The apparatus of claim 6, wherein in the calculating of the expected vehicle weight value by comparing the time required or the operating speed with the preset reference data, the weight estimating unit is configured to calculate the expected vehicle weight value in consideration of vehicle height at a time when the time required for raising or lowering the vehicle body or the operating speed of the vehicle body is started to be measured.

9. The apparatus of claim 1, wherein the vehicle height adjusting device includes:

an electric actuator installed at each of the FL and FR sides and at each of the RL and RR sides of the vehicle to adjust a relative location of the vehicle body with respect to wheels; and a battery configured to store power provided to the electric actuator.

10. A method of estimating vehicle weight by using a vehicle height adjusting device, comprising:

raising or lowering by a controller, front left (FL) and right (FR) sides and rear left (RL) and right (RR) sides of a vehicle body by operating the vehicle height adjusting device; and calculating, by the controller, an expected vehicle weight value by measuring time required for raising or lowering the vehicle body or operating speed of raising or lowering the vehicle body, and by comparing the time required or the operating speed with preset reference data;

wherein the calculating of the expected vehicle weight value includes:

measuring, by the controller, the time required for raising the vehicle body or the operating speed of raising the vehicle body and the time required for lowering the vehicle body of the operating speed of lowering the vehicle body;

calculating, by the controller, a first expected vehicle weight value according to a preset calculation criterion by comparing the time required for raising the vehicle body or the operating speed with the preset reference data; and calculating, by the controller, a second expected vehicle weight value according to the preset calculation criterion by comparing the time required for lowering the vehicle body or the operating speed with the preset reference data; and wherein preset weights are applied to the first expected vehicle weight value and the second expected vehicle weight value, respectively to calculate a final expected vehicle weight value.

11. The method of claim 10, wherein the preset weights are set such that the second expected vehicle weight value is greater than the first expected vehicle weight value.

12. The method of claim 10, wherein:

in the raising or lowering of the vehicle body, the FL and FR sides and the RL and RR sides of the vehicle body are sequentially raised or lowered in predetermined combinations, in the calculating of the expected vehicle weight value, the required time or the operating speed is measured while the predetermined combinations are sequentially raised or lowered, respectively, and a weight distribution of the FL and FR sides and the RL and RR sides of the vehicle is calculated by comparing the time required or the operating speed with respect to the predetermined combinations with the preset reference data.

13. The method of claim 12, wherein a first combination of the combination of the FL and FR sides and the combination of the RL and RR sides of the vehicle body is raised or lowered first, and then a second combination of the combination of the FL and FR sides and the combination of the RL and RR sides of the vehicle body is raised or lowered.

14. The method of claim 12, wherein a first combination of the combination of the FL and RL sides and the combination of the FR and RR sides of the vehicle body is raised or lowered first, and then a second combination of the combination of the FL and FR sides and the combination of the RL and RR sides of the vehicle body is raised or lowered.

15. The method of claim 10, wherein, when the vehicle height adjusting device uses a pneumatic actuator, in the calculating of the expected vehicle weight value by comparing the time required or the operating speed with the preset reference data, the expected vehicle weight value is calculated by reflecting variables for frictional force, temperature, and a cross-sectional area of a chamber, inside the pneumatic actuator.

16. The method of claim 10, wherein, in the calculating of the expected vehicle weight value by comparing the time required or the operating speed with the preset reference data, the expected vehicle weight value is calculated based on vehicle height at a time when the time required for raising or lowering the vehicle body or the operating speed of the vehicle body is started to be measured.

* * * * *